Nov. 28, 1933.   J. R. JOHNSON   1,937,408
MACHINE TOOL
Filed Aug. 3, 1929   7 Sheets-Sheet 1

INVENTOR.
JOHN R. JOHNSON
BY
*William A. Knight*
ATTORNEY.

Nov. 28, 1933.   J. R. JOHNSON   1,937,408
MACHINE TOOL
Filed Aug. 3, 1929   7 Sheets-Sheet 2

INVENTOR.
JOHN R. JOHNSON
BY
ATTORNEY.

Nov. 28, 1933.  J. R. JOHNSON  1,937,408
MACHINE TOOL
Filed Aug. 3, 1929   7 Sheets-Sheet 4

INVENTOR.
JOHN R. JOHNSON
BY
ATTORNEY

Nov. 28, 1933.   J. R. JOHNSON   1,937,408
MACHINE TOOL
Filed Aug. 3, 1929    7 Sheets-Sheet 5

INVENTOR.
JOHN R. JOHNSON
BY
ATTORNEY.

Nov. 28, 1933.  J. R. JOHNSON  1,937,408
MACHINE TOOL
Filed Aug. 3, 1929  7 Sheets-Sheet 6

Fig. 13

INVENTOR.
JOHN R. JOHNSON
BY
ATTORNEY.

Patented Nov. 28, 1933

1,937,408

UNITED STATES PATENT OFFICE 1,937,408

MACHINE TOOL

John R. Johnson, Rockford, Ill., assignor to The Ingersoll Milling Machine Company, Rockford, Ill., a corporation of Illinois Application August 3, 1929. Serial No. 383,287

20 Claims. (Cl. 90—17)

The present invention relates in general to machine tools and has particular reference to an improved tool and tool head assembly which is not necessarily limited to, but in the present instance has been designed for, use in connection with a conventional adjustable rail milling machine of the planer type.

Among the important objects of the invention is to provide a machine tool which, in addition to performing certain machining operations, will also serve the special purpose of milling the inside dimensions of die castings such as are used in the manufacture of automobile bodies.

Another important object of the invention is to provide a machine of the class described which will lend itself with unusual advantage to milling the inside dimensions of hollow objects such as above-mentioned and particularly where the inside surfaces to be milled extend to a considerable depth within the hollow of the work piece or include difficult angular surfaces or irregularities all of which being inaccessible to cutters heretofore devised.

Another and more specific object of the invention is to provide a machine tool having a driving spindle disposed with its axis of rotation parallel to a horizontal plane through the work to be operated on and at right angles to a ram or feed screw structure which carries the tool and suspends the same from a head or saddle assembly in which the ram is mounted for reciprocation without interrupting the drive to the tool.

Still another object of the invention is to provide a machine tool as explained in the preceding paragraph and in which the tool is capable of being angularly adjusted throughout a radius of 360° relatively of the ram or feed screw structure.

A still further object of the invention is to provide a machine tool of the character explained and in which the head or saddle assembly includes a swiveled or other mounting suitable to allow for angular adjustments of the ram or feed screw, which carries the tool.

Other objects of the invention will appear hereinafter, the novel features and combinations being set forth in the appended claims.

In the accompanying drawings which have been selected to illustrate the application of the invention.

Figures 1, 2, 3:
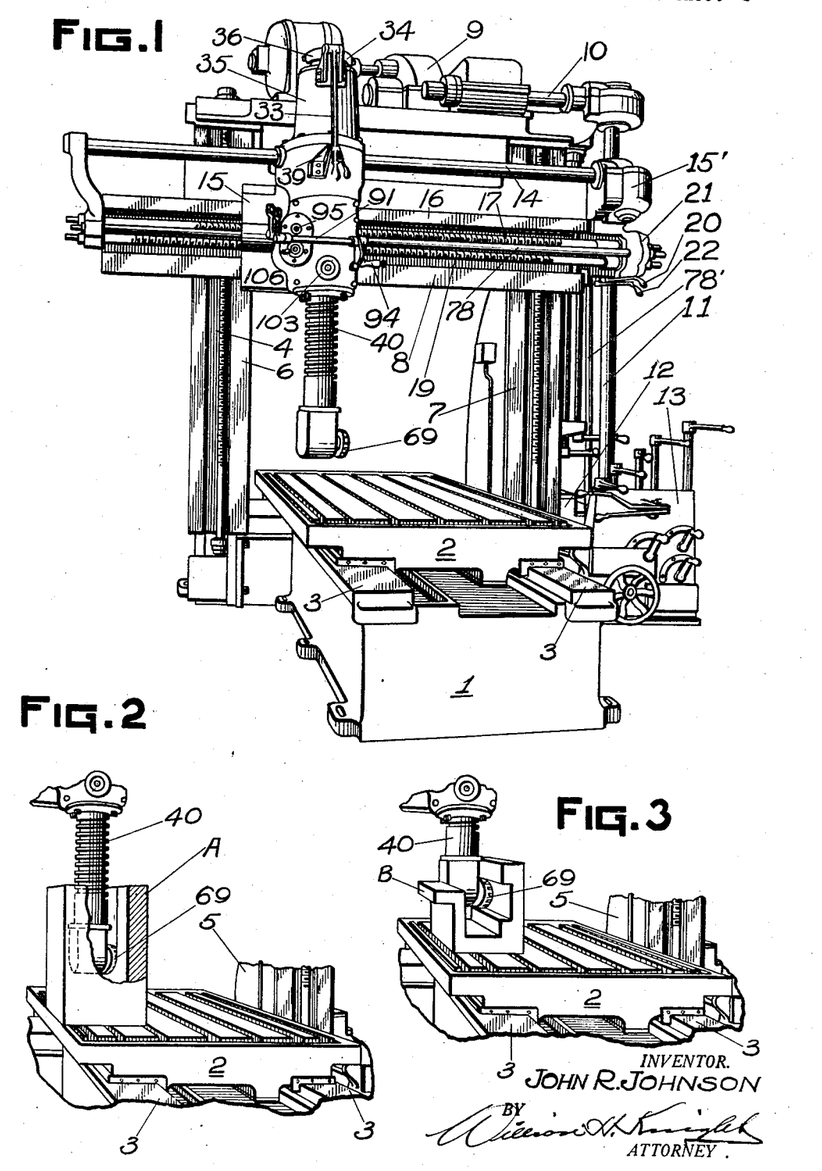
Fig. 1 is a perspective view of a milling machine equipped with the invention.
Fig. 2 is a detail view in perspective showing one of the uses that the machine may be put to when constructed or equipped with the invention.
Fig. 3 is a view similar to Fig. 2, but showing still another operation that may be performed with the invention.

Referring to the drawings in detail—1 represents the machine bed on which the work table 2 is mounted to slide upon the ways 3 between the housings 4 and 5 of the frame. As the present illustration happens to be an adjustable rail machine, it will be noted that the housings are provided with slides or ways 6 and 7 on which the rail 8 is adapted to be adjusted as to height relatively of the table. The power for driving the tool spindles, if there be more than one, or the tool spindle, since only one is shown, is derived from an electric motor and delivered through the reduction gearing 9 to the short drive shaft 10, then to the vertical power shaft 11, into the feed box 12. A suitable control panel 13 is arranged in front of the feed box.

Power for driving the tool spindle is taken off the vertical shaft 11 by the rail carried horizontal shaft 14, and the bevel gear in the gear box 15' is splined on the shaft 11, so as to transmit a drive to shaft 14 for any position of the rail.

According to the preferred form of the invention, the improved tool is mounted upon the rail 8, and, in order that it may be a horizontally adjusted, the saddle 15 of the head assembly is slidably mounted upon the horizontal ways 16 of the rail. Horizontal adjustments of the head along the rail are provided for by the threaded shaft 1 0

Figures 4, 5, 6:
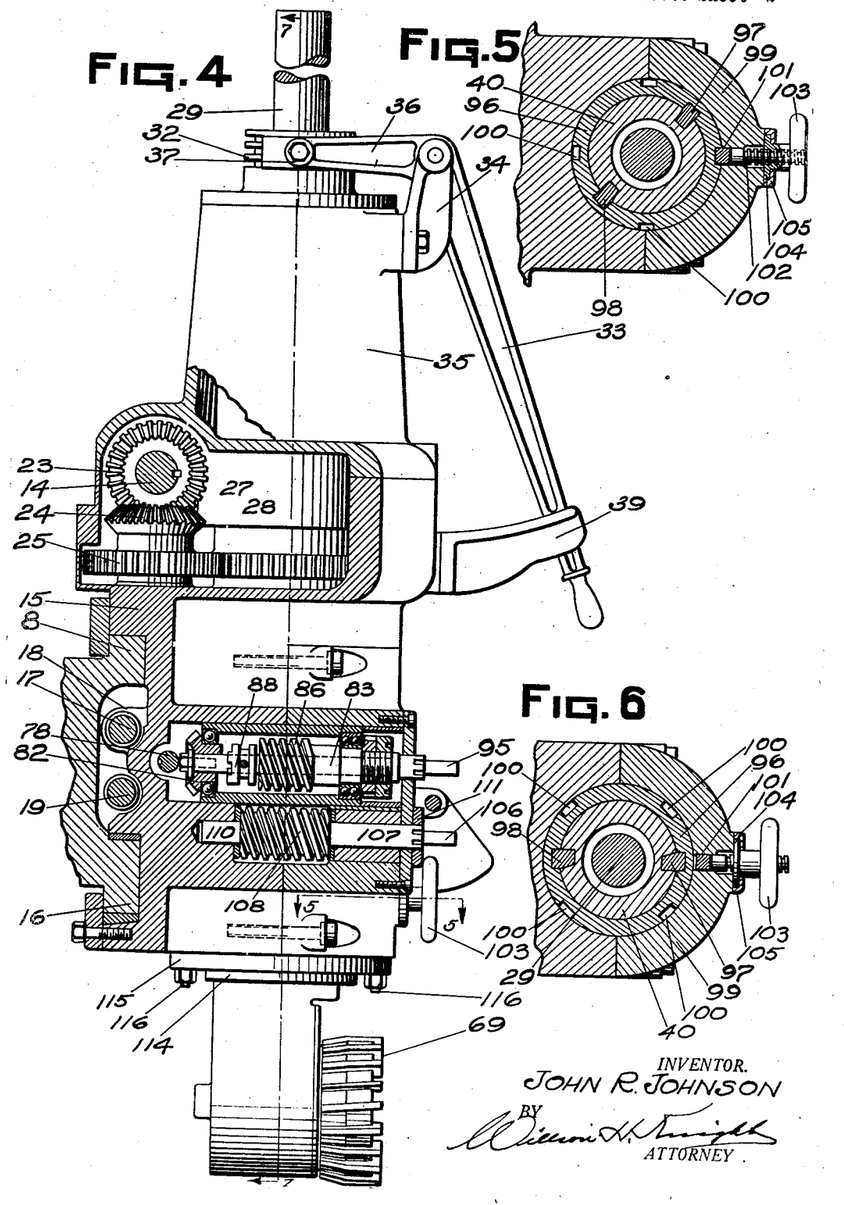
Fig. 4 is an enlarged view in side elevation of the tool head with parts broken away to show certain of the enclosed parts thereof.
Fig. 5 is a view in cross section taken on the line 5—5 Fig. 4.
Fig. 6 is a view similar to Fig. 5 but showing the locking pin disengaged.

17 which passes through a feed nut 18 on the saddle (see Fig. 4).

The adjacent parallel threaded shaft 19 is arranged for a second head which may be applied to the rail. Rotation of the shaft 17 in one direction will feed the head along the rail one way and opposite rotation of the shaft will feed the head in the opposite direction. The shaft may be power or manually rotated and a clutch lever 20 may be manipulated to clutch and declutch the shaft from driving relation with the power drive in the gear box 21. The other lever 22 serves in the same capacity on the shaft 19 when a second head is employed.

The drive for the tool is taken off the horizontal shaft 14 by the bevel gear 23 (see Fig. 4) which is splined on the shaft to establish the drive at any position of the head. The gear 23 is in constant mesh with a mating bevel gear 24 which is fixed to rotate with the driving gear 25.

Figure 7:
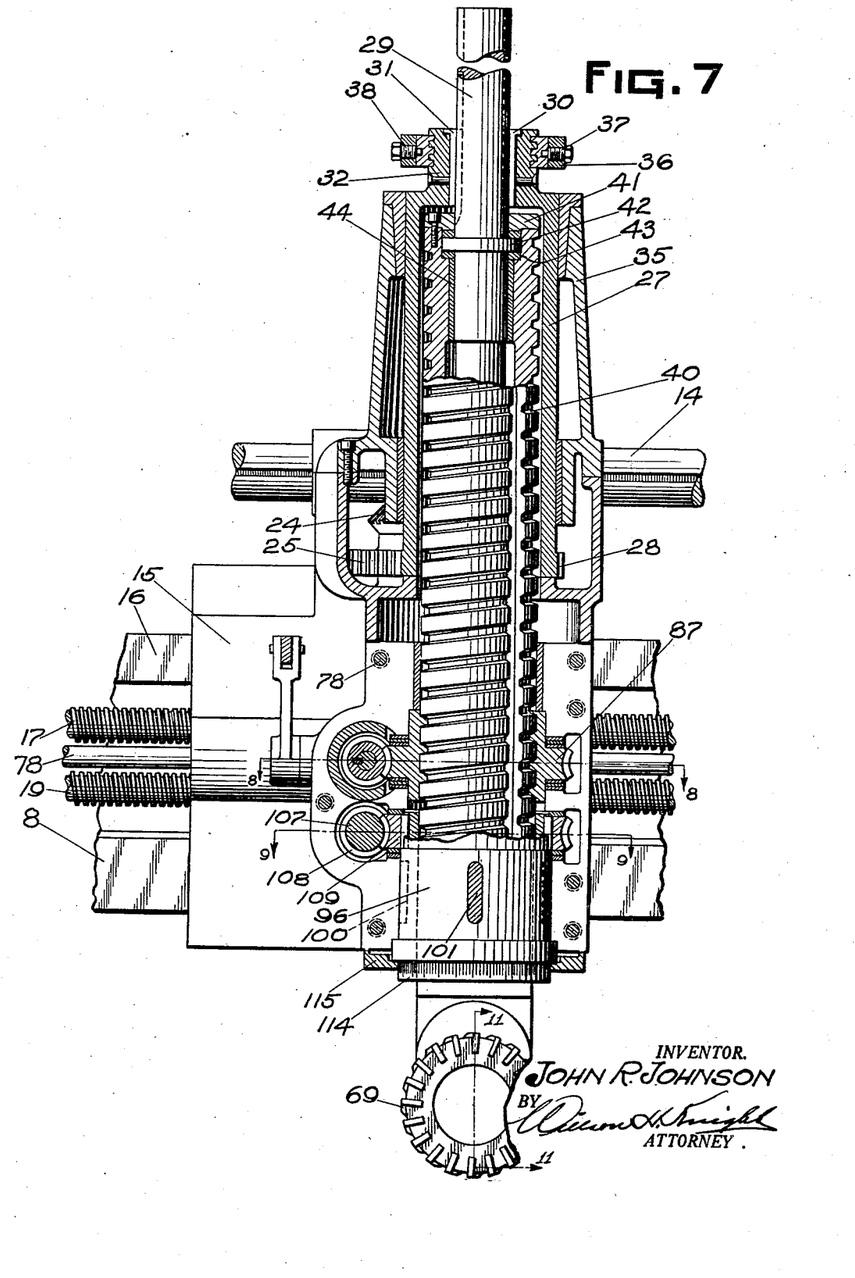
Fig. 7 is a vertical section taken on the line 7—7 Fig. 4.

Fixed on the lower end of the cylindrical sleeve 27 and vertically shiftable therewith is a driven gear 28. The sleeve is elevated and lowered to disengage and engage the gears 25 and 28 so as to control the drive to the drive shaft 29. As best shown in Fig. 7, the sleeve 27 and the drive shaft 29 are connected in driving relation through means of the opposed keys 30 and 31 on the inside of the collar portion 32 of the sleeve seating in the keyways on the drive shaft.

The sleeve is elevated and lowered by hand lever 33 to shift the driven gear 28. The lever 33 is fulcrumed in the bracket 34 on the cover 35 of the head. The fulcrumed end of the lever terminates in a fork 36 which is in turn pivoted as at 37 and 38 to tongue and groove equipped block segments which fit a complementary annular tongue and grooved fixture on the outside of the collar porton 32 of the sleeve. A suitable keeper 39 is provided for the handle end of the lever.

Housed within the sleeve 27 is a hollow feed screw or ram 40. The drive shaft projects into the hollow of this screw and is fixed against vertical movement within the screw but free for relative angular movement. For this purpose the screw held cap 41 on the top of the screw is made with a central opening to receive the drive shaft and the shaft is made with an annular flange 42, which is confined between the cap 41 and an annular shoulder 43 on the screw. Suitable bushings 44 are provided between the drive shaft and the screw just below the shoulder 43 and around the flange 42.

The opposite end of the drive shaft is reduced in diameter, as at 45, and is piloted in the sleeved extension 46 of the drive pinion 47. Since the drive shaft must drive the pinion 47, it is keyed as at 48 and 49 within the bore of the sleeved extension 46 and the sleeved extension is bushed within the feed screw.

Meshing with the drive pinion 47 is a beveled drive gear 50 which is keyed upon the transverse idler shaft 51. The opposite ends of this shaft are journalled in suitable anti-friction bearings 52 and 53. Also keyed on the idler shaft 51 coaxially of the gear 50 is a gear 54 which is in constant mesh with a mating gear 55. The gear 55 is keyed on the intermediate reduced diameter 56 of the spindle 57. The spindle 57 is fashioned with other varying diameters so that, beginning with its outer end, it is stepped down with the inner end 58 terminating in the smallest diameter. This extremity is internally threaded to receive the flanged plug which is employed to adjust the tension on the roller bearing 60. After the proper adjustment is made, the set screw 61 may be used to hold the same. The bearing 62 for the opposite end of the spindle is confined between the annular flange 63 on the spindle and a shoulder 64 on the extension 65 of the feed screw 40.

The small diameter of the spindle is externally threaded, as at 66, for the nuts 67. The nuts are employed to hold the gear 55 in proper alignment with the gear 54.

The shank 68 for the cutter 69 is mounted within the spindle 57 and held against relative movement. The shank bolt 70 is threaded into the end of the shank with its opposite end projecting through an axial bore in the plug and terminating with a flange 71 which lies flush with the plug 59, and a nut 72 is threaded to the bolt behind the flange 71.

The bearing 52 for one end of the idler shaft 51 is enclosed by a plate 73 which is attached to the back side of the extension 65 of the feed screw. The opposite bearing 53 is enclosed by a plate 74 which is attached to the front of the feed screw extension. The back end of the spindle mounting is also enclosed by a plate 75. Owing to the desirability of having convenient access to the enclosed parts within the spindle mounting, a piece intermediate the front and back has been removed and an insert 76 used to fill in. The insert is held in place by a long screw 77.

From the foregoing it will be seen that when the lever 33 is moved outwardly into the position shown in Fig. 4, the sleeve 27 is thrust downwardly shifting the driven gear 28 on the lower end of the sleeve into mesh with the gear 25, thus establishing a drive through the gears 24 and 23 with the power shaft 14. Rotation of the sleeve 27 as a result of this geared engagement will cause the drive shaft 29 in the head to also rotate, which, in turn, will drive the cutter 69 through the gear train comprising the gears 50, 54 and 55, the latter being keyed on the spindle 57 in which the cutter shank is secured.

One of the outstanding features of the combination resides in the mechanism for feeding the cutter toward the table during a milling operation. With this operation it is possible to feed the cutter downwardly into the hollow of not only one die casting or other work piece having inside walls to mill, but it is even possible to superimpose several castings, one upon the other, with their inside walls lined up, and then mill all of them with one set up. This operation is fairly well shown in Fig. 2 in which the cutter is shown milling one inside wall of the work piece A for a considerable depth. In this special operation, the table is stationary. In Fig. 3 the cutter is shown milling a longitudinal undercut slot or recess in the piece B. In this instance the elevation of the cutter is fixed and the work table is being fed.

These two examples of the many combinations which may be realized with the tool do not begin to explain its possibilities; but when it is remembered that the tool may be raised and lowered by hand or power, either continuously or in progressive stages, to any elevated or lowered position within the limits of the feed screw 40, plus the adjustability of the rail, and when it is further remembered that the cutter may be angularly adjusted, it will be readily appreciated how many different operations may be performed. It should also be pointed out that the machine may be equipped with an additional vertical head and also one or more horizontal heads so that both inside and outside operations may be performed collectively or selectively.

Figure 8:
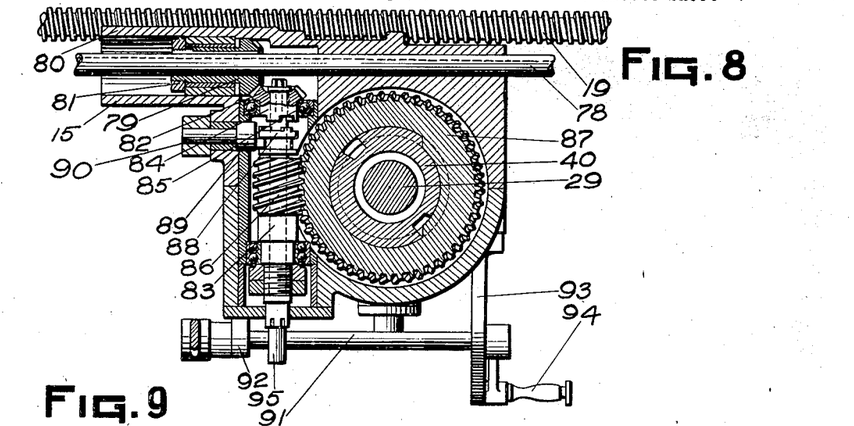
Fig. 8 is a cross-section taken on the line 8—8 Fig. 7.
Figures 9, 10:
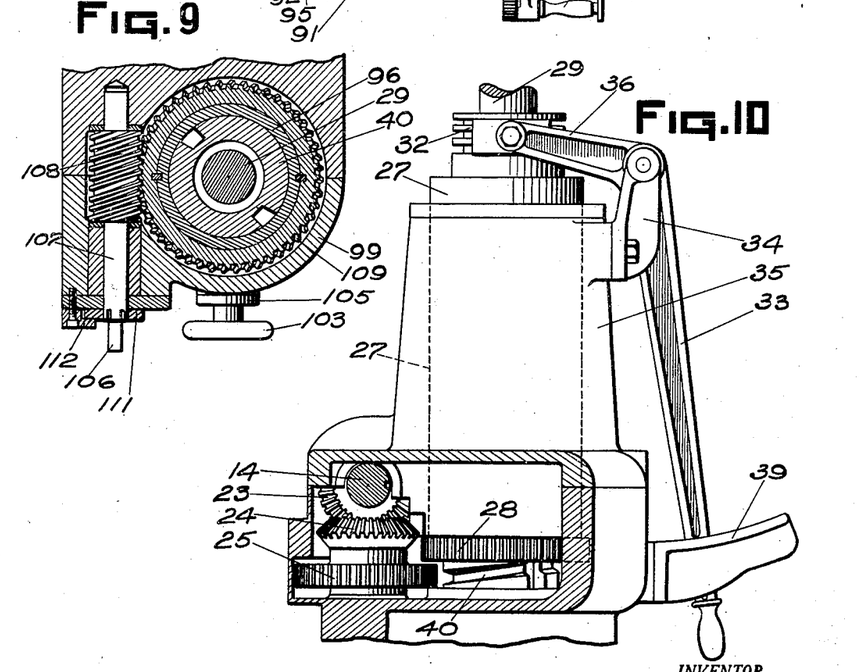
Fig. 9 is a cross-section taken on the line 9—9 Fig. 7.
Fig. 10 is a view in side elevation and partly in section of the upper portion of the head.
Figure 11:
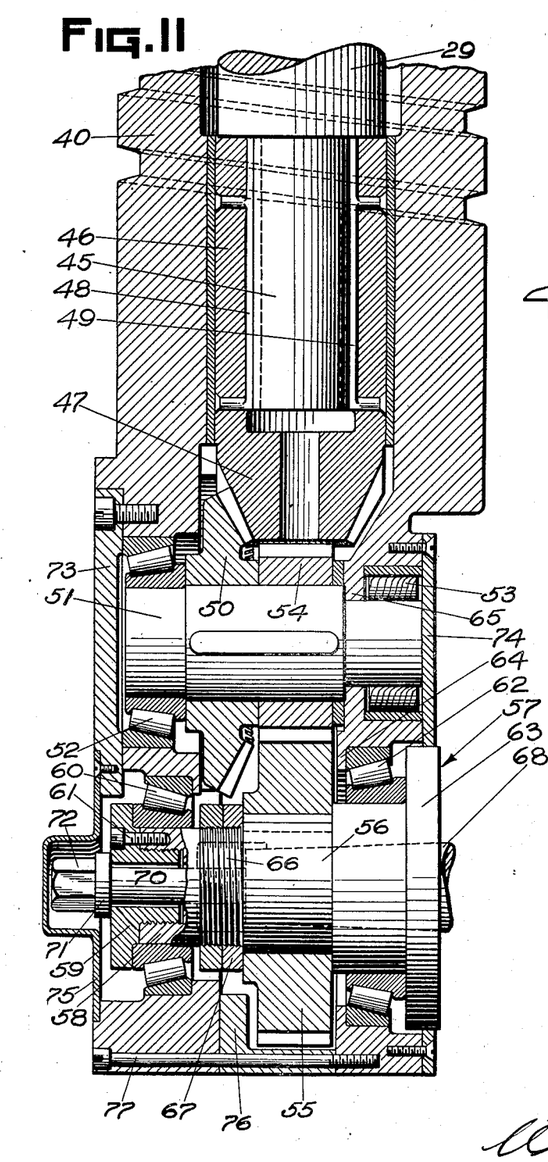
Fig. 11 is an enlarged view in vertical section taken on the line 11—11 Fig. 7.
Figure 12:
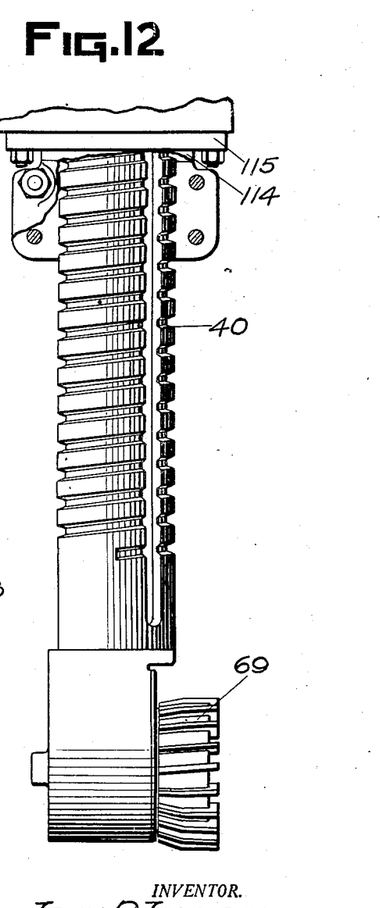
Fig. 12 is an enlarged view in side elevation of the vertical feed screw.

The power drive for elevating and lowering the feed screw comprises the power shaft 78 (see Figs. 1 and 8) which is driven off the vertical shaft 78' through the gear box 21. The shaft 78 extends along the rail through the saddle 15, and a driving pinion 79 is splined thereon. This pinion is enclosed in a cylindrical housing 80 and bushings including nut 81 serve as a suitable journal bearing for the sleeved extension of the pinion. Meshing with this pinion is a driven gear 82 which is fixed upon a worm shaft 83 and has one part 84 of a dog clutch on its back face. The gear is properly set in an anti-friction bearing 85 and the worm shaft carries a worm 86 which is in constant mesh with a worm gear 87 which encircles the screw 40 and has internal threads meshing with the threads of the screw. The mating part 88 of the dog clutch is splined on the worm shaft so that it may be axially moved into engagement with the part 84 to connect the shaft 83 in driving relation with the power shaft 78 through the gears 79 and 82.

The dog clutch is actuated by an eccentric pin 89 on the end of the pintle 90, and a link motion connects the pintle with a rod 91 which is supported in front of the tool head by bracket arms 92 and 93 and carries a hand crank 94. When it is desired to power drive the feed screw or ram 40, the hand crank 94 is manipulated to engage the dog clutch. To disconnect the drive, the hand crank is moved in an opposite direction.

It is, of course, understood that reversal in the direction of the feed of the screw is obtained in the feed box 12 without interfering with the main drive.

To elevate or lower the screw by hand a wrench is applied to the projecting end 95 of the worm shaft 83.

Figs. 5 and 6 show the locking pin mechanism for holding the screw against rotation and, as a result, causing it to feed in response to the worm drive. Referring now to Fig. 7, it will be seen that a sleeve 96 encircles the screw and is keyed thereto at diametrically opposite sides 97 and 98. The sleeve is enclosed by the cover part 99 and is fashioned with a plurality of circumferentially spaced notches 100 which are made to receive the end of a pin 101 carried by the cover part 99. The pin is provided with quick acting threads 102 for a portion of its length which have a threaded engagement through the collar of the hand wheel 103. The collar of this hand wheel is made with a flanged end 104 which is rotatably confined in a fitting 105. Rotation of the wheel in one direction will retract the pin and rotation in an opposite direction will feed it into one of the notches 100.

Normally the locking pin will be seated in one of the notches so that the screw will be caused to feed in response to the drive on the worm 86. However, it will be frequently necessary to change the angularity of the cutter, in which event the pin will first be retracted, and with the dog clutch to the worm 86 out of engagement, a wrench may be applied to the projecting end 106 of the shaft 107 and the screw turned by hand to change the angular position of the cutter. This shaft 107 carries a worm 108 which meshes with a worm gear. The gear 109 is keyed or otherwise fixed to the sleeve 96. The end of the shaft 107 is journalled in a bore 110.

Under some conditions it may be necessary to adjust the cutter at an angle which will not register any of the notches 100 with the pin 101. In this event, the worm 108 will be relied on to hold the screw against turning. To fortify the worm, however, and make a positive retainer out of it, a circular key 111 is fitted to the wrench hold on the projecting end 106 of the shaft. A clamp 112 is detachably fixed to the plate 113 and positioned to overlap to key and thus hold the shaft against turning.

As a still further means for holding the ram or feed screw structure against turning, a ring 114 encircles the ram and is fixed against relative rotation thereon, and an annular flange on the ring is seated behind an annular clamping plate 115 which carries bolts 116. By turning up on the nuts carried by the bolts 116, the clamp may be caused to clamp the ring firmly and thus resist rotation of the ram. It is, of course, appreciated that the ring, while being fixed against relative rotation on the ram, does not interfere with the up and down feed of the ram. In order to accurately determine the angular adjustment of the tool throughout a radius of 360°, the ring 114 is graduated with the gauge marking provided on the clamp 115 to register with the graduations.

In the above description, it will be seen that the assembly and co-operative relationship of the parts provides a machine tool having a driving spindle disposed with its axis of rotation parallel to a horizontal plane through the work to be operated on and at right angles to a ram or feed screw structure which carries the tool and suspends the same from a head or saddle assembly in which the ram is mounted for reciprocation without interrupting the driving to the tool.

It will be further seen that the invention also provides a machine tool, as explained in the preceding paragraph, in which the tool is capable of being angularly adjusted throughout a radius of 360° relatively of the ram or feed screw structure.

Figure 13:
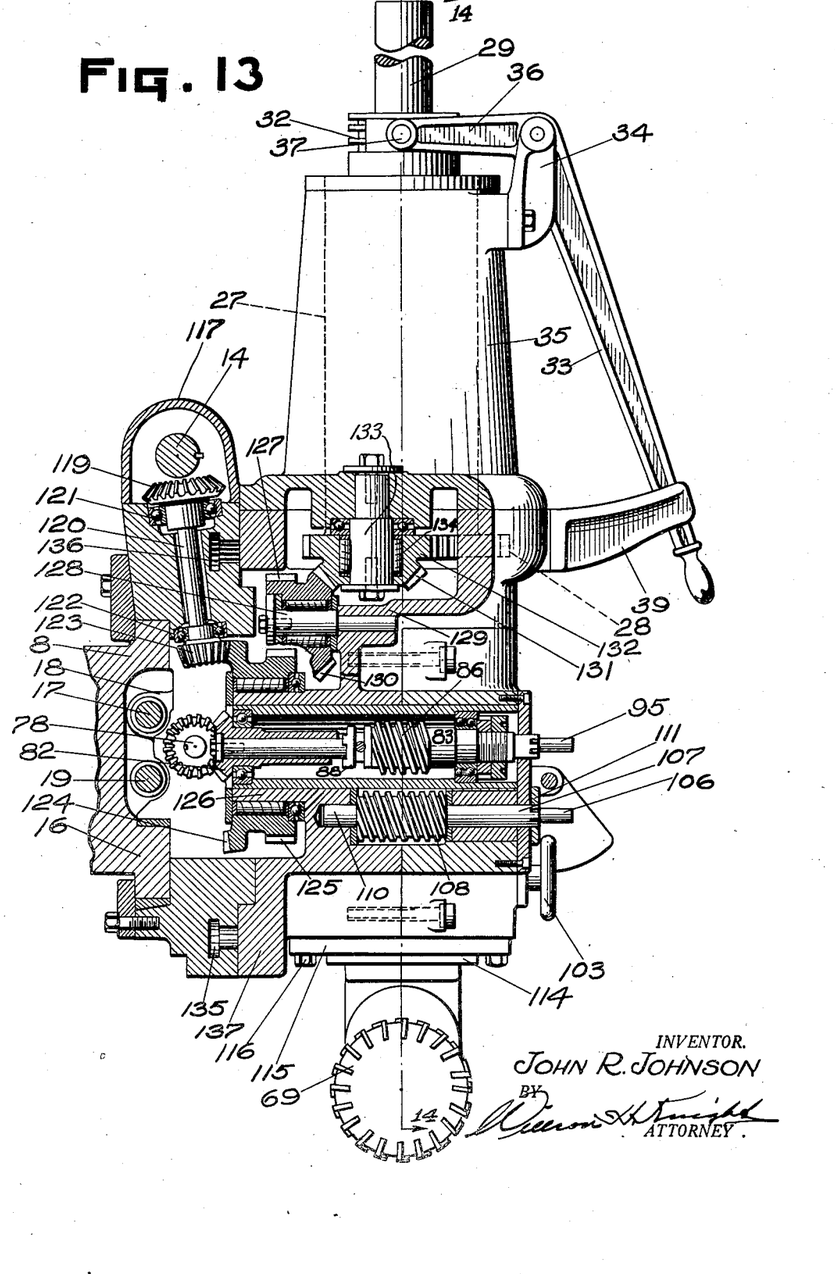
Fig. 13 is a view in side elevation and partly in section of a modified form of the invention.
Figure 14:
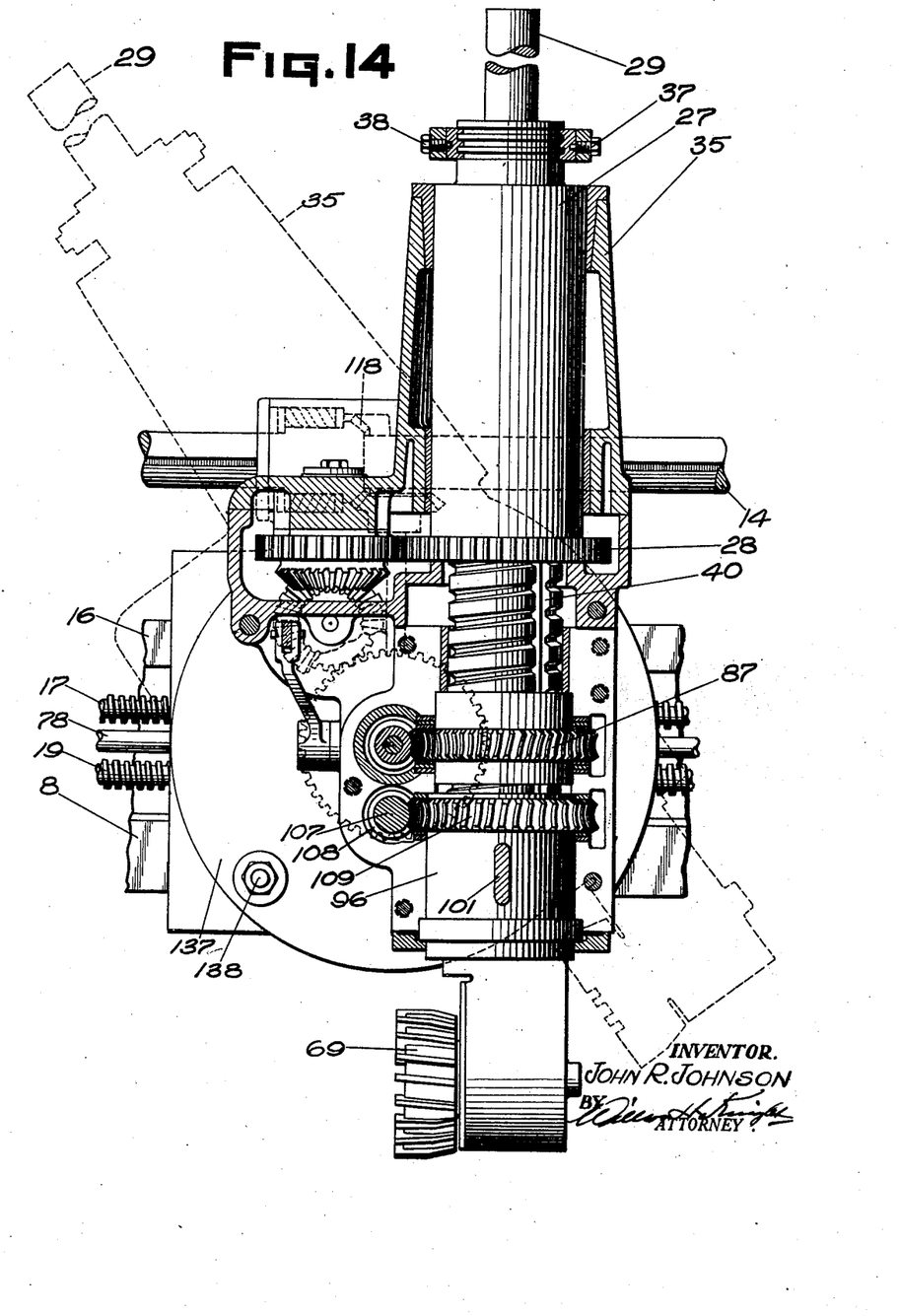
Fig. 14 is a view in section taken on the line 14—14 Fig. 13.

In Figures 13 and 14 I have shown an important modification of the invention and in which provision is made in the head or saddle assembly for mounting the ram or feed screw 40 and the tool which it carries so that it may be oscillated about a horizontal axis from a perpendicular position as shown in full lines in Figure 14 into a position at a decided slant to the vertical such, for example, as shown by dotted lines in Figure 14.

The mounting which I prefer to employ for accomplishing this objective explained in the preceding paragraph, is a swivel with the same so arranged as to account for a wide range of slant in adjustments. In the particular embodiment of the assembly selected for illustrating the principle of this modification I am showing a construction which adapts itself unusually well to the detail construction shown in Figures 1 to 7. I wish it to be understood, however, that in practice some changes will be required in the construction of the modified form but any such changes need not depart from the spirit and scope of the invention as defined by the sub-joined claims and I, therefore, do not wish to be limited to the precise embodiment shown.

In this modified form as in the other embodiment the head or saddle assembly is horizontally slidable on the rail 8 and power for driving the spindle is taken off the vertical shaft 11 by the rail carried horizontal shaft 14. Keyed on the shaft 14 within the housing 117 is a bevel gear 118 (see the dotted lines in Figure 14). This bevel gear 118 is in constant mesh with a companion gear 119 which is mounted on the inclined shaft 120 and with the shaft journaled with freedom of rotation in the anti-friction bearings 121 and 122 adjacent its respective ends. Carried on the lower end of shaft 120 is a bevel gear 123 which is in constant mesh with the gear 124 which is formed as an integral part of the co-axially disposed gear 125. The gears 124 and 125 are mounted with freedom of rotation on a horizontal axis upon the sleeve 126 which is formed as a part of the casting in which the mechanism of the head is assembled. Suitable roller bearings are provided for the double gears 124 and 125 and the latter is in constant mesh with gear 127 which is mounted with its axis of rotation co-axial to the gear 125 upon a shaft 128 which in turn is mounted in the journal bearing 129. Carried on the back of the gear 127 and formed integral therewith is a bevel gear 130 which is in constant mesh with a companion gear 131 formed as an integral part of the drive gear 132 which corresponds to the gear 25 in the other embodiment as a driver for the gear 28. Gears 131 and 132 are mounted upon the vertical stud shaft 133 which is properly supported in roller bearings 134. It will thus be seen that the drive for the driven gear 28 in this modified form of the invention is taken off the shaft 14 thru the gear system just described and after reaching the driven gear 28 it is the same as explained for the other form of the invention. The power drive for elevating or lowering the feed screw or ram 40 is taken off the shaft 78 in substantially the same way as explained for the other embodiment except the gear 82 is made with a longer sleeve on the end of which is arranged one part of the dog clutch which engages the part 88 just in front of the worm 86. This elongated sleeve was not required in the other embodiment. The worm 108 for manually rotating the ram or feed screw is the same in this modified construction as in the first described embodiment.

The saddle 15 in this modified form is made with a plate in which oppositely extending circular slots 135 and 136 are provided. These slots are made for the reception of pins or the like which are carried by the swivel part 137 of the assembly. To hold an adjustment, that is to say clamp the part 137 with the saddle, suitable bolts 138 are employed.

To adjust the ram at an angle to the vertical the bolts 138, of which there are four, will be loosened and the head can then be oscillated into the angular position required and the bolts 138 then tightened up to hold the adjustment. When thus oscillated the drive from the shafts 14 and 78 is so arranged as to be undisturbed and in this way the drives can be employed for any angular position of the head about its swivel point.

While I prefer to employ the same right angle position of the tool 69 relative to the ram or feed screw the tool will ordinarily be turned so that its axis of rotation while being at right angles to the ram will also be parallel to the rail.

From the above it will be seen that with this modified form of the invention pieces may be milled by the tool 69 which have sides or other surfaces disposed at a decided slant to the vertical and that by universal adjustments of the head it will make no difference whether the slanting surfaces to be milled are on the right hand or left hand side of the work piece. In fact, combining the swivel adjustments with the other adjustments which are possible with the mechanism a wide variety of milling work can be formed and this applies also to the use of a machine for boring and drilling.

While the invention has been illustrated and its salient features explained in connection with a milling machine with the tool comprising a milling cutter, it is, of course, to be understood that I do not necessarily confine myself to this particular adaptation of this invention since it has many possibilities in machining operations other than milling, such, for example, as boring, drilling and other instances where metal is to be not only surface finished, but even perforated.

With the addition of this swivel mounting it will be seen that I have provided a mounting for the tool on which it is adjustably mounted to swing about a horizontal axis, another mounting for the tool on which it is mounted to swing about a vertical axis, and means for driving the tool in all positions within the adjustable range of said mountings.

There is still another possibility. The two mountings for the tool referred to in the preceding paragraph may be used to advantage in combination with the ram so that the tool may be fed to and from the work in all positions within the adjustable range of said mountings and in addition thereto driven during such feeding movement and in all positions within the adjustable range of said mountings.

Having thus described and shown an embodiment of this invention, what I claim and desire to secure by Letters Patent of the United States is:

1. In a machine tool, the combination of a work table means for feeding the table, means for holding the table stationary at will, a horizontal structure above the work table, a tool head assembly mounted on said structure and horizontally movable crosswise of the table, a ram on said head assembly, a drive shaft in said ram, a rotary tool carried adjacent the lower end of said ram having a spindle disposed at an angle to the ram, a gear train connecting said drive shaft with the spindle of said tool, a power driven sleeve for imparting a drive to the drive shaft, manually controlled means for interrupting said drive imparted by said sleeve, and means for feeding the ram up and down relatively to the head assembly without interrupting said drive for the tool.

2. The combination as set forth in claim 1 and in which means are provided for adjusting the position of the tool throughout a working range of 360°.

3. In a milling machine of the planer type, the combination of a frame structure, a work supporting table, means for feeding the table at will, a horizontal rail mounted for vertical movement on said frame structure above said table, a tool saddle mounted for horizontal movement on said rail, a swivel mounting on said saddle, a drive shaft carried by one part of said swivel mounting, a milling cutter with its axis of rotation disposed at an angle to said drive shaft, means for feeding the cutter up and down relatively to said table, means for swinging the swivel of said mounting on a horizontal axis for disposing the milling cutter at a slant to the vertical, and means for driving the milling cutter when the same is feeding up and down relatively to the table and in all positions within the adjustable range of said swivel mounting.

4. In a machine tool, the combination of a work support, a tool head, a drive shaft in said head, a rotary tool mounted with its axis of rotation transversely to said drive shaft and driven thereby, a feed screw for feeding the tool relatively to said tool head, a power driven sleeve surrounding said screw and a driving connection between said sleeve and said drive shaft.

5. In a machine tool, the combination of a work support, a tool head, a drive shaft in said head, a feed screw surrounding said shaft, a power driven sleeve surrounding said screw and having a driving connection with said shaft, a rotary tool mounted with its axis of rotation transversely to said shaft and driven thereby and means for angularly adjusting the position of said tool, throughout a circumference of approximately 360°.

6. In a machine tool, the combination of a work support, a tool head, a rotary tool, driven from said head, a drive shaft in said head for driving said tool, a screw surrounding said shaft for feeding the tool relatively of said head and a power driven sleeve surrounding said screw and having a splined driving connection with said drive shaft.

7. In a machine tool, the combination of a work support, a tool head, a drive shaft in said head, a feed screw surrounding said shaft, a power driven sleeve surrounding said screw and having a driving connection with said shaft, a rotary tool mounted with its axis of rotation transversely to said shaft and driven thereby and means including a graduated scale to adjust the angular position of said tool relatively to the axis of said drive shaft.

8. A tool head for machine tools comprising a feed screw, a rotary tool carried thereby with its axis of rotation transversely to the axis of said screw, a feed nut threaded on said screw, means for normally locking the feed screw against rotation, means for rotating the feed nut to impart a feed to said screw, means for releasing said screw, locking means for rotating the screw to angularly adjust the tool, and means for driving said tool.

9. A tool head for machine tools, comprising a feed screw, a rotary tool carried thereby with its axis of rotation transversely to the axis of said screw, a feed nut threaded on said screw, means for normally locking the feed screw against rotation, means for rotating the feed nut to impart a feed to said screw, means for releasing said screw, locking means for rotating the screw to angularly adjust the tool, and means for driving said tool, comprising a drive shaft surrounded by said screw, a power driven sleeve surrounding said screw and a splined driving connection between said drive shaft and said sleeve.

10. In a machine tool, the combination of a work support, a rotary tool, a mounting therefor, a normally non-rotatable feed screw in said mounting for feeding said tool, a spindle for said tool mounted with its axis transversely to the feed screw axis, means for releasing the feed screw for rotation to bodily move the tool about the axis of the feed screw and means for driving the tool spindle in any position into which it is bodily moved about the axis of the feed screw.

11. In a machine tool, the combination of a work support, a rotary tool, a mounting therefor, a normally non-rotatable feed screw in said mounting for feeding said tool, a spindle for said tool mounted with its axis transversely to the feed screw axis, means for releasing the feed screw for rotation to bodily move the tool about the axis of the feed screw and means for driving the tool throughout the feeding range of the screw and in any position into which it is bodily moved about the axis of the feed screw, comprising a power driven splined shaft having a driving connection with the tool spindle.

12. In a machine tool, the combination of a work support, a rotary tool, a mounting therefor, a normally non-rotatable feed screw in said mounting for feeding said tool, a spindle for said tool mounted with its axis transversely to the feed screw axis, means for releasing the feed screw for rotation to bodily move the tool about the axis of the feed screw and means for driving the tool throughout the feeding range of the screw and in any position into which it is bodily moved about the axis of the feed screw, comprising a power driven shaft mounted within an internal bore in the feed screw and having driving connection with the tool spindle, and in any position in to which it is bodily moved about the axis of the feed screw, comprising a power driven shaft mounted for relative rotation within an internal bore in the feed screw and having a driving connection with the tool spindle.

13. In a machine tool, the combination of a work support, a tool for performing an operation on work carried by said support, a feed screw on which said tool is mounted, a tool saddle in which said feed screw is mounted, means for feeding said screw relatively of the saddle, means for swinging said screw about a horizontal axis, means for angularly adjusting the tool relatively of the feed screw and a drive for the tool operable throughout the swinging and feeding range of the feed screw and throughout the adjustable range of the tool relatively of the feed screw.

14. In a machine tool head, a ram, means for feeding the ram relatively of the head, means for holding said ram against turning movement to effect said feed, a rotary tool carried by the ram with its axis of rotation disposed at an angle to the ram, means for releasing said ram for turning movement to adjust the position of the tool about the axis of the ram and means for maintaining a drive for the tool throughout the feeding range of the ram and throughout the adjustable range of the tool about the axis of the ram.

15. In a machine tool head, a ram, means for feeding the ram relatively of the head, a rotary tool, a mounting on said ram for holding the tool in a predetermined working position with its axis of rotation at an angle to the longitudinal axis of the ram, means for releasing said tool for turning movement to change the position of the tool about the axis of the ram and means for maintaining a drive for the tool throughout the feeding range of the ram and throughout the adjustable range of the tool about the axis of the ram, comprising a tool spindle mounted co-axially of the ram, a tool shank for the tool, gearing connecting said spindle with said shank, and a power driven sleeve surrounding the ram having a splined driving connection with said spindle.

16. In a machine tool head, a ram, an internally threaded worm engaging said ram, means for holding said ram against turning movement to feed the same by said worm, a rotary tool carried by the ram with its axis of rotation disposed at an angle to the ram, means for releasing said ram for turning movement to adjust the position of the tool about the axis of the ram and means for maintaining a drive for the tool throughout the feeding range of the ram and throughout the adjustable range of the tool about the axis of the ram, comprising a tool spindle mounted co-axially of the ram, a tool shank for the tool gearing connecting said spindle with said shank, and a power driven sleeve surrounding the ram having a splined driving connection with said spindle.

17. In a machine tool head, a ram, a rotary tool carried by the ram, with its axis of rotation disposed at an angle to the axis of the ram, means for feeding the ram relatively of the head, means holding said ram against turning movement to effect said feed, means for releasing the ram for turning movement for adjusting the tool throughout a predetermined working range and means for driving the tool throughout said working range.

18. In a machine tool head, a tool spindle, a ram, a rotary tool carried by the ram and connected in driving relation with said spindle at an angle thereto, means for feeding the ram relatively of the head, means for maintaining the driving relation between the spindle and tool during said feed, means holding said ram against turning movement to effect said feed, means for releasing the ram for turning movement to change the angularity of the tool and means for maintaining the driving relation between the spindle and tool throughout the angularly adjustable range of the tool.

19. A machine tool comprising an axially movable ram, a tool unit, carried by the ram at right angles thereto, a head in which the axially movable ram is mounted for relative feeding movement, a power drive for feeding the ram, a hand drive for feeding the ram when the power drive is disconnected, and clamp means for angularly adjusting the tool unit relative to the ram in an infinite number of positions about the axis of the ram.

20. A machine tool having, in combination, a supporting head, an elongated tubular member mounted on said head for axial movement, a tool spindle extending transversely of said member at one end thereof and mounted thereon for angular adjustment about the longitudinal axis of the member, a shaft extending through said member and having a connection with said spindle for driving the same in all positions of said angular adjustment, means normally holding said spindle in its adjusted position and releasable to permit of angular adjustment of said spindle, a power driven rotary feed element on said head, and mechanism connecting said element and said member in all angular positions of adjustment of said spindle and operable to convert the rotary motion of said element into reciprocatory motion of said member.

JOHN R. JOHNSON.